United States Patent [19] [11] 4,281,099
Maresca [45] Jul. 28, 1981

[54] PROCESS FOR STABILIZING POLYARYLATES WITH AN AROMATIC PHENOL

[75] Inventor: Louis M. Maresca, Belle Mead, N.J.

[73] Assignee: Union Carbide Corporation, New York, N.Y.

[21] Appl. No.: 89,270

[22] Filed: Oct. 29, 1979

[51] Int. Cl.³ .............................................. C08L 67/02
[52] U.S. Cl. .............................. 528/176; 260/45.95 R; 525/437; 528/179; 528/180; 528/181; 528/191; 528/193; 528/195; 528/308; 528/309
[58] Field of Search ................ 525/437; 528/176, 179, 528/180, 181, 191, 193, 195, 308, 309; 260/45.95 R

[56] References Cited

U.S. PATENT DOCUMENTS

| | | | |
|---|---|---|---|
| 3,317,464 | 5/1967 | Conix | 528/179 |
| 3,775,375 | 11/1973 | Wolfe | 260/45.95 R |
| 3,948,856 | 4/1976 | Stackman | 528/173 |
| 4,011,196 | 3/1977 | Carevic et al. | 260/45.85 B |
| 4,124,566 | 11/1978 | Saiki et al. | 525/437 |

FOREIGN PATENT DOCUMENTS 50-130845 10/1975 Japan .

Primary Examiner—Maurice J. Welsh
Attorney, Agent, or Firm—Donald M. Papuga

[57] ABSTRACT

Described herein is a process for preparing melt stable polyarylates having a reduced viscosity of from about 0.4 to greater than 1.0 dl/g which comprises reacting a diester derivative of a dihydric phenol with an aromatic dicarboxylic acid to produce a polyarylate having a reduced viscosity of from about 0.5 to greater than 1.0 dl/g, and then adding a stabilizing amount of an aromatic phenol to the polyarylate to form a polyarylate substantially free of anhydride linkages.

26 Claims, No Drawings

PROCESS FOR STABILIZING POLYARYLATES WITH AN AROMATIC PHENOL

BACKGROUND OF THE INVENTION

This invention is directed to a process for preparing melt stable polyarylates having a reduced viscosity of from about 0.4 to greater than 1.0 dl/g which comprises reacting a diester derivative of a dihydric phenol with an aromatic dicarboxylic acid to produce a polyarylate having a reduced viscosity of from about 0.5 to greater than 1.0 dl/g and then adding a stabilizing amount of an aromatic phenol to the polyarylate to form a polyarylate substantially free of anhydride linkages.

Polyarylates are polyesters derived from a dihydric phenol, particularly 2,2-bis(4-hydroxyphenyl)propane also identified as bisphenol-A, and an aromatic dicarboxylic acid, particularly mixtures of terephthalic and isophthalic acids. These polyarylates are high temperature, high performance thermoplastic polymers with a good combination of thermal and mechanical properties. They also have good processability which allows them to be molded into a variety of articles.

Many processes have been described in the literature for the preparation of polyarylate. One such process is the diacetate process. In the diacetate process, a dihydric phenol is converted to its diester derivative which is then reacted with aromatic dicarboxylic acid to form the polyarylate.

A proposed reaction mechanism for the preparation of polyarylates by the diacetate process is illustrated for the reaction of bisphenol-A diacetate and a mixture of isophthalic and terephthalic acids:

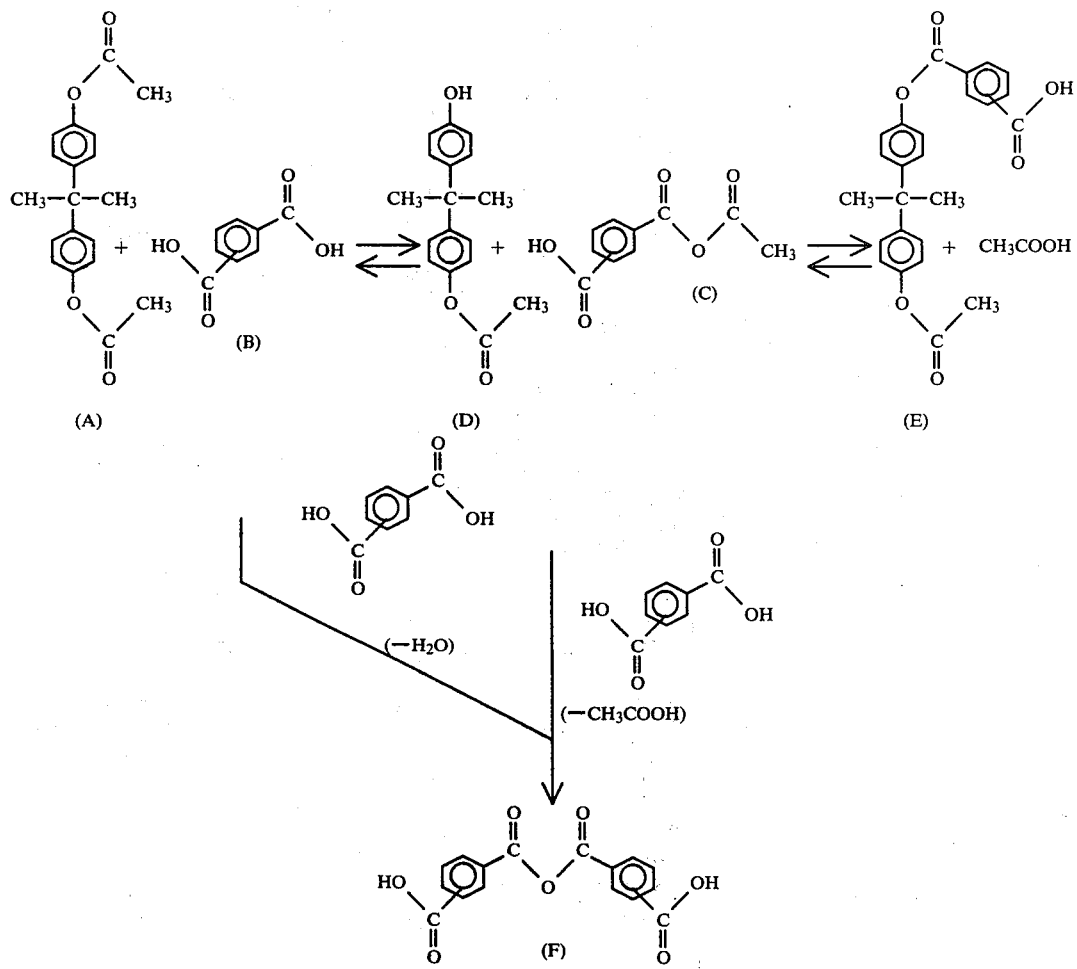

In addition to producing the polyarylate (E), the reaction of iso and/or terephthalic acids (B) and bisphenol-A diacetate (A) can produce anhydride (F), either by way of the intermediate mixed anhydride (C) or by the direct reaction of two molecules of the phthalic acid (B), accompanied by the loss of water. Due to the reactivity of anhydride (F), only a low equilibrium concentration of anhydride linkages will remain in the polymer backbone at the end of the reaction. These anhydride linkages are believed to be labile enough to cause loss of molecular weight when the polymer is exposed to high temperatures, i.e., 320°-400° C., which are those needed to fabricate the polyarylate. Therefore, elimination of these anhydride linkages prior to processing the polyarylate is deemed necessary to help prevent the loss of molecular weight.

It has been surprisingly discovered that the addition of an aromatic phenol at the end of the polyarylate forming reaction eliminates the anhydride linkages and stabilizes it without significantly effecting the aromatic ester linkage.

U.S. Pat. No. 4,011,196 describes the addition of a hindered phenol antioxidant or stabilizer in a small or stabilizing amount to a polyester resin-forming reaction mixture during the initial transesterification stage in which a zinc catalyst is used, or during the final polymerization stage before the desired intrinsic viscosity of the polymer is reached.

However, the transesterification process described in this reference would not produce anhydride linkages.

Japanese publication No. J5 0130-845 describes aromatic polyesters prepared from aromatic dicarboxylic acids and bispheols mixed with 0.01 to 1 weight percent of phenolic stabilizers. An example in this publication describes the addition of 0.5 parts of 2,6-di-tert-butyl-4-methylphenol dissolved in acetone to an aromatic polyester derived from 2,2-bis(4-hydroxyphenyl)propane and a 1:1 terephthalic and isophthalic acid dichloride mixture.

However, the interfacial polymerization of this reference would not be expected to produce anhydride linkages.

DESCRIPTION OF THE INVENTION

The present invention is directed to a process for the preparation of a melt stable polyarylate having a reduced viscosity of from about 0.4 to greater than 1.0 dl/g, which comprises reacting a diester derivative of a dihydric phenol with an aromatic dicarboxylic acid, at a temperature of from about 260° to about 350° C., to produce a polyarylate having a reduced viscosity of from about 0.5 to greater than 1.0 dl/g, and then adding a stabilizing amount of an aromatic phenol to the polyarylate to form a polyarylate substantially free of anhydride linkages; said aromatic phenol should be free of substituents in at least one of the positions ortho to the hydroxy group.

The present process comprises reacting:

(a) at least one diester derivative of a dihydric phenol having the following formula:

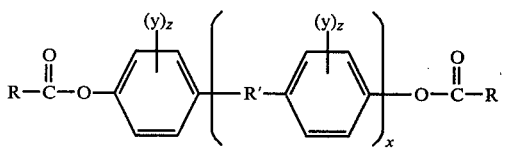

wherein R is independently selected from an alkyl radical having from 1 to about 6 carbon atoms, preferably methyl, or a cycloalkyl radical having from 4 to about 7 carbon atoms, y is independently selected from alkyl groups of 1 to 4 carbon atoms, chlorine or bromine, z independently has a value of from 0 to 4, inclusive, and R' is independently selected from a direct bond, a divalent saturated aliphatic hydrocarbon radical, particularly alkylene or alkylidene radicals having from 1 to 8 carbon atoms, especially $C(CH_3)_2$, cycloalkylene or cycloalkylidene radicals having up to and including 9 carbon atoms, O, S, SO, $SO_2$, and CO, x is 0 or 1; and (b) at least one aromatic dicarboxylic acid, at a temperature of from about 260° to about 350° C., to produce a polyarylate having a reduced viscosity of from about 0.5 to greater than 1.0 dl/g; and (c) adding a stabilizing amount of an aromatic phenol to the polyarylate to form a polyarylate substantially free of anhydride linkages; said aromatic phenol being free of substituents in at least one of the positions ortho to the hydroxy group.

The diester derivative of the dihydric phenol is prepared by reacting a dihydric phenol with an acid anhydride derived from acids containing from 2 to 8 carbon atoms under conventional esterification conditions. The preferred acid anhydride is acetic anhydride. Optionally, the dihydric phenol is reacted with the acid anhydride in the presence of an esterification catalyst, either in the presence or absence of a solvent.

The dihydric phenols that may be used in this invention include the following:
2,2-bis(4-hydroxyphenyl)propane,
bis-(2-hydroxyphenyl)methane,
bis-(4-hydroxyphenyl)methane,
bis-(4-hydroxy-2,6-dimethyl-3-methoxyphenyl)methane,
1,1-bis-(4-hydroxyphenyl)ethane,
1,2-bis(4-hydroxyphenyl)ethane,
1,1-bis-(4-hydroxy-2-chlorophenyl)ethane,
1,1-bis-(3-methyl-4-hydroxyphenyl)ethane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxyphenyl)pentane,
3,3-bis-(4-hydroxyphenyl)pentane,
2,2-bis-(4-hydroxyphenyl)heptane,
1,2-bis-(4-hydroxyphenyl)-1,2-bis-(phenyl)-propane,
4,4'-(dihydroxydiphenyl)ether,
4,4'-(dihydroxydiphenyl)sulfide,
4,4'-(dihydroxydiphenyl)sulfone,
4,4'-(dihydroxydiphenyl)sulfoxide,
4,4'-dihydroxybenzophenone,
4,4'-dihydroxybiphenyl
hydroquinone, and
naphthalene diols.

These dihydric phenols may be used individually or in any combination which when reacted with an aromatic dicarboxylic acid produce polyarylate polymers that essentially do not crystallize during the reaction and recovery steps. The preferred dihydric phenol is 2,2-bis(4-hydroxyphenyl)propane.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to 4 carbon atoms, and acids containing other inert substituents such as halides, alkyl or aryl ethers, and the like. Preferably, mixtures of isophthalic and terephthalic acids are used. The isophthalic acid to terephthalic acid ratio in the mixture is about 20:80 to about 100:0, while the most preferred acid ratio is about 25:75 to about 50:50. Also, from about 0.5 to about 20 percent of aliphatic diacids containing from 2 to about 20 carbon atoms, such as adipic acid, sebacic acid, and the like, may be additionally used in the polymerization reaction.

The dihydric phenols and aromatic dicarboxylic acids are selected so that the polyarylate produced remains in an essentially amorphous state during the polymerization and recovery step.

A wide variety of aromatic phenols can be used herein including oligomeric and polymeric aromatic phenols. However, the aromatic phenol must have at least one of the positions ortho to the hydroxyl group free of substituents. Also, the total number of unhindered hydroxy groups should not exceed three.

The aromatic phenols are selected from the following formulae:

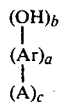  (I)

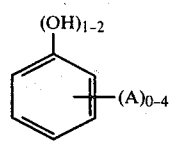  (III)

wherein A is as previously defined.

The preferred aromatic phenols include p-phenylphenol, p-cumylphenol, 4-hydroxybenzophenone, β-naphthol, hydroxy terminated polysulfone, and hydroxy terminated polyethersulfone.

The aromatic phenol is added to the polymerization reaction in a stabilizing amount, that is in amounts of from 0.01 to about 10, and preferably, from about 0.1 to about 2.0 mole percent, based on the amount of the starting materials. The aromatic phenol is optionally added in a solvent. The solvents discussed, infra, are preferred.

wherein Ar is an aromatic radical derived from a hydrocarbon such as benzene, naphthalene and anthracene and containing 6 to 30 carbon atoms; a is an integer of from 1 to 5; b is an integer of from 1 to 15 with the proviso that the number of unhindered hydroxy groups is at least one and should not exceed 3; c is equal to any remaining free position on the Ar radical, taking into account that there may be up to three hydroxy groups, each with one adjacent unsubstituted position; A is a substituent which is non-reactive with the ester linkage of the polyarylate under the reaction conditions, such as halo, alkyl, aryl, alkylene, arylene, alkylaryl, arylalkyl, —Oaryl, —Oalkyl, —OCOaryl, —OCOalkyl, —COOalkyl, —COOaryl,

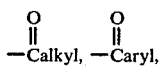

—SO$_2$aryl, —SO$_2$alkyl, —SO$_3$—alkyl, —SO$_3$—aryl, wherein the aryl and arylene contains 6 to about 30 carbonatoms and the alkyl or alkylene contains 1 to about 8 carbon atoms;

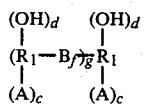  (II)

wherein R$_1$ is independently an aromatic radical derived from a hydrocarbon such as benzene, naphthalene and anthracene containing 6 to 30 carbon atoms; B is independently a direct bond or a divalent radical such as —O—, —S—, —S—S—,

—SO—, —SO$_2$—,

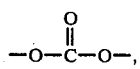

alkylene, arylene, alkylarylene, arylalkylene,

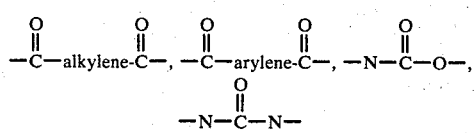

and the like, wherein the arylene contains 6 to about 30 carbon atoms and the alkylene contains 1 to about 20 carbon atom; A and c are as previously defined; f and g are independently integers of from 1 to 15; d is an integer of from 1 to 15, with the proviso that the number of unhindered hydroxy groups is at least one and does not exceed 3.

The reaction of the diester derivative of a dihydric phenol with the aromatic dicarboxylic acid is carried out in the presence of from about 10 to about 60, preferably from about 25 to about 40, and most preferably, from about 30 to about 40 weight percent, based on the weight of the polyarylate produced, of a solvent.

The solvent may be a diphenyl ether compound (also known as diphenyl oxide) as described in U.S. Pat. Application Ser. No. 069,818, filed Aug. 29, 1979, in the names of M. H. Berger et al., titled "Process for Preparing Polyarylates in the Presence of a Diphenyl Ether", and assigned to the same assignee as this invention.

The diphenyl ether compound may be substituted. These substituents are selected from alkyl groups, chlorine, bromine or any substituent which does not interfere with the polyarylate forming reaction or the reaction forming the diester derivative of the dihydric phenol.

Also, the solvent may be a cycloaliphatic, substituted aromatic, or heteroaromatic compound, which contains at least one benzylic and/or tertiary hydrogen atom as described in U.S. Patent Application Ser. No. 069,819, filed Aug. 27, 1979, in the names of M. H. Berger et al., titled "Process for Preparing Polyarylates", and assigned to the same assignee as this invention.

The compounds as described in said U.S. Patent Application Ser. No. 069,819, have a boiling point of from about 150° to about 350° C., preferably from about 180° to about 280° C., and most preferably from about 180 to about 220° C., at atmospheric pressure. Additionally, these compounds have a solubility parameter, at a temperature of 250° C., of ±4 within the solubility parameter of the polyarylate being produced. Solubility parameter is a measure of correlating polymer solvent interaction. It is defined in "Properties of Polymers", D. W. Van Krevelen, Elsevier Scientific Publishing Co., Amsterdam-Oxford-New York, 1976, pp. 141-155, as the square root of the cohesive energy density.

the cycloaliphatic compounds are of the following formulae:

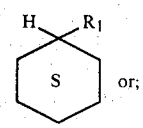  (IV)

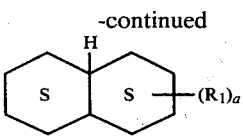

wherein R₁ is independently alkyl of 1 to 6 carbon atoms, cycloalkyl of 6 to 18 carbon atoms, and a is an integer of 1 to 2.

The substituted aromatic compounds are of the following formulae:

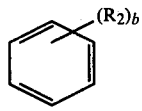

wherein R₂ is independently alkyl of 1 to 6 carbon atoms, cycloalkyl of 6 to 18 carbon atoms and aralkyl or alkaryl of 7 to 18 carbon atoms and wherein the carbon atom of R₂ attached directly to the benzene nucleus has 1 to 2 attached hydrogen atoms, and b is an integer of 1 to 6.

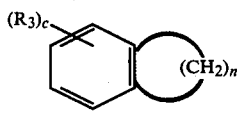

wherein R₃ is independently alkyl of 1 to 6 carbon atoms, cycloalkyl of 6 to 18 carbon atoms, c is an integer of 1 or 2, and n is an integer of 1 to 6.

The heteroaromatic compounds are of the following formula:

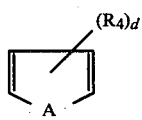

wherein A is S, O, or —CH=N—, R₄ is independently alkyl of 1 to 6 carbon atoms, or cycloalkyl of 6 to 18 carbon atoms and wherein the carbon atom of R₄ attached directly to the heteroaromatic nucleus has 1 to 2 attached hydrogen atoms, and d is an integer of 1 to 4.

The preferred compounds encompassed by structures (IV) through (VIII) include xylenes, cumene, diethylbenzene, diisopropyl benzene, tetrahydronaphthalene or decahydronaphthalene.

Additionally, the cycloaliphatic, substituted aromatic or heteroaromatic compounds may be used with up to 90 weight percent of other compounds such as diphenyl ether, dimethylsulfone, etc.

The amount of said solvents could vary during the polymerization reaction. For example, it may be advantageous to increase progressively the amount of these solvents to maintain the reaction medium at constant viscosity.

The reaction of the diester derivative of the dihydric phenol with the aromatic dicarboxylic acid may be performed in the presence of a catalyst.

The use of a diphenyl ether solvent with a magnesium catalyst is described in U.S. Patent Application Ser. No. 070,039, filed Aug. 27, 1979, in the names of L. M. Maresca et al., titled "Process for Preparing Polyarylates in the Presence of a Diphenyl Ether compound and a Catalyst", and assigned to the same assignee as this application.

The magnesium catalyst is selected from magnesium, magnesium oxide and a magnesium salt of an inorganic acid, or organic acid or mixtures thereof. The salts of the organic acid include acetates, propionates, benzoates, oxalates, acetylacetonates, or mixtures thereof.

The catalyst may also include manganese or zinc salts as described in U.S. Patent Application Ser. No. 069,819, supra. The salts of the organic acids include acetates, propionates, benzoates, oxalates, acetylacetonates, or mixtures thereof. The most preferred catalyst is magnesium acetate. The catalyst, when used, is present in the reaction in a catalytically effective amount which can be, for example, from about 1 to about 1000, preferably from about 10 to about 50 parts per million, based on the weight of the polyarylate produced.

The reaction of the diester derivative of the dihydric phenol with the aromatic dicarboxylic acid is performed with these reactants present in the ratio of from about 0.85:1.00 to about 1.10:1.00, preferably from about 0.98:1.02 to about 1.02:0.98, diester derivative:aromatic dicarboxylic acid.

The process of this invention is carried out at a temperature of from about 260 to about 350° C. and preferably, from about 275 to about 295° C. The present process is generally conducted in an inert atmosphere (such as argon or nitrogen). The process is preferably carried out at atmospheric pressure although higher and lower pressures may be used. Obviously, at pressures higher than atmospheric pressure, higher temperatures will result.

The polymerization reaction is conducted for a period of time sufficient to produce a polyarylate having a reduced viscosity of at least about 0.5 to greater than 1.0 dl/g, which time is generally less than about 10 hours. The reaction time is generally in the range of from about 4 hours to about 8 hours, depending on the particular polyarylate being prepared. The addition of the aromatic phenol to the polymerization reaction causes a decrease in molecular weight. Therefore, the polymerization should be carried out until the reduced viscosity is about about 0.05 dl/g of the desired reduced viscosity and then the aromatic phenol added to the polymerization. Following this addition, the polymerization is continued for about 10 to about 180, and preferably, from about 10 to about 45 minutes.

The polymerization reaction of this invention may be carried out batchwise or continuously and by using any apparatus desired. Moreover, the reactants may be added to the polymerization zone in any way or order desired as long as the aromatic phenol is added after the desired molecular weight has been exceeded as determined by having the reduced viscosity exceed the desired reduced viscosity by about 0.05 dl/g.

The diester derivative of the dihydric phenol may be formed in situ, by adding the dihydric phenol together with the acid anhydride, an aromatic dicarboxylic acid and solvent to the reactor and the reaction carried out in a single reaction zone under combined esterification and polymerization conditions as described above. Additionally, the diester derivative of the dihydric phenol may be first prepared and then an aromatic dicarboxylic acid added to the same reaction vessel with the polymerization being carried out under the conditions described above.

The polyarylate polymer having a reduced viscosity of at leasst about 0.4 dl/g, is recovered in its final form by methods well known to those in the art, such as by direct devolatilization in an extruder under conditions sufficient to remove the solvent, coagulation, spray drying, and the like.

The polyarylates may also be prepared by first forming a polyarylate prepolymer having a reduced viscosity of from about 0.1 to about 0.4 dl/g, by reacting the diester derivative of a dihydric phenol with an aromatic dicarboxylic acid under the conditions described previously, for a reaction time of about 3 hours.

The polyarylate prepolymer may be added directly, after its formation, to a vented extruder wherein the molecular weight is increased to form a polymer having a reduced viscosity of from about 0.5 to greater than about 1.0 dl/gm. For example, the molecular weight of polyarylate prepolymer is increased in the extruder at a temperature of from about 300° to about 350° C., under a vacuum of about 0.3 to about 2 mm Hg and a residence time of from about 10 to about 30 minutes. The aromatic phenol can be added to the polymer in the extruder after the desired molecular weight has been exceeded as determined by having the reduced viscosity exceed the desired reduced viscosity by about 0.05 dl/g.

The process of this invention produces normally solid polyarylates having a reduced viscosity of from about 0.4 to greater than about 1.0, preferably from about 0.6 to about 0.8 dl/gm, as measured in chloroform (0.5 g/dl chloroform) or other suitable solvent at 25° C.

In those instances where the polyarylate is not soluble in chloroform, other solvents known in the art such as parachlorophenol, phenol/tetrachloroethane (60/40), etc. may be used. Reduced viscosities of the polyarylates measured in these solvents generally have the same reduced viscosity range.

The polyarylates may be prepared in the presence of materials such as molecular weight regulators, antioxidants, and the like.

The polyarylates obtained by the process of this invention may be used together with the well-known additives such as plasticizers, pigments, lubricating agents, mold release agents, stabilizers, inorganic fillers, and the like. These polyarylates may also be blended with other polymers.

EXAMPLES

The following examples serve to give specific illustrations of the practice of this invention but they are not intended in any way to limit the scope of this invention. In these examples, all parts and percentages are on a weight basis unless otherwise specified.

Comparative Example A

A three neck, 250 ml round bottom flask was equipped with a mechanical stirrer, a nitrogen inlet and a vacuum jacketed vigreux column and distillation head. 31.20 g (0.10 moles) of bisphenol-A diacetate, 8.30 g (0.05 moles) of isophthalic acid, 8.30 g (0.05 moles) of terephthalic acid and 10.74 g of diphenyl ether were charged to the flask. The system was purged with nitrogen for 1 hour at room temperature. While maintaining a constant nitrogen purge the reaction mixture was heated to between 260° and 270° C. Acetic acid began to distill at this point. After one hour, the temperature was increased to between 290° and 300° C. A partial vacuum (150 mm of Hg) was applied to the reaction after 2 hours at this temperature. The vacuum was reduced to <1 mm of Hg in a stepwise fashion (50 mm/30 min.). After an additional one hour at 290°–300° C. and a full vacuum (<1 mm of Hg) the system was allowed to cool to ambient temperature. The resulting polyarylate was ground and then dried under vacuum at a temperature of 120° to 130° C. for 24 hours.

The reduced viscosity of this polymer was measured in chloroform (0.50 g/100 ml) at 25° C. and found to be 0.52 dl/g.

The melt stability of the polymer was measured in a Tinius Olsen thermodyne (melt flow cell) at 375° C. The polymer was added to the preheated (375° C.) chamber of the termodyne and put under a constant pressure of 44 psi. After 10 and 30 minutes at 375° C., samples of the polymer were taken by allowing the polymer to flow freely from the bottom of the cavity. The reduced viscosity of these samples was measured in chloroform (0.50 g/100 ml) at 25° C. and found to be 0.42 and 0.37 dl/g, respectively.

EXAMPLE 1

The procedure as described in Comparative Example A to prepare a polyarylate polymer was exactly repeated except that 30 minutes before the reaction was stopped, the vacuum was released with nitrogen. A solution of 0.0085 g ($5 \times 10^{-5}$ moles) of p-phenylphenol in 1 ml of diphenyl ether was added to the vessel. The resulting mixture was stirred 15 minutes before a full vacuum (<1 mm of Hg) was reapplied. After an additional 30 minutes under full vacuum and a temperature of 290°–300° C., the reaction mixture was allowed to cool to ambient temperature.

The polymer was ground and dried as described in Comparative Example A. The reduced viscosity of this polymer was measured in chloroform (0.50 g/100 ml) at 25° C. and found to be 0.57 dl/g.

The polymer was then added to a Tinius Olsen thermodyne and tested by the procedure described in Comparative Example A. The reduced viscosity of the samples obtained after 10 and 30 minutes in the thermodyne were 0.58 and 0.52 dl/g, respectively.

EXAMPLE 2

The procedure of Example 1 was exactly repeated except that 0.017 g ($1 \times 10^{-4}$ moles) of p-phenylphenol was added instead of 0.0085 g of the p-phenylphenol The reduced viscosity of the polymer formed and the reduced viscosity of samples obtained after 10 and 30 minutes in the thermodyne are shown in the Table.

EXAMPLE 3

The procedure of Example 1 was exactly repeated except that 0.039 g ($2 \times 10^{-4}$ moles) of 4-hydroxybenzophenone was added.

The reduced viscosity of the polymer formed and the reduced viscosity of samples obtained after 10 and 30 minutes in the thermodyne are shown in the Table.

EXAMPLE 4

The procedure of Example 1 was exactly repeated except that 0.029 g ($2 \times 10^{-4}$ moles) of β-naphthol was added.

The reduced viscosity of the polymer formed and the reduced viscosity of samples obtained after 10 and 30 minutes in the thermodyne are shown in the Table.

Comparative Example B

The procedure of Example 1 was exactly repeated except that 0.106 g ($2\times10^{-4}$ moles) of octadecyl 3-(3',5'-di-t-tubyl 4'-hydroxyphenyl) proprionate (Irganox 1079, sold by Ciba-Geigy Corporation) was added.

The reduced viscosity of the polymer formed and the reduced viscosity of samples obtained after 10 and 30 minutes in the thermodyne are shown in the Table.

Comparative Example C

The reactor system consisted of a hot oil heated one gallon reactor fitted with a nitrogen inlet, mechanical agitator, and fractionating column (packed with ceramic saddles) connected to an overhead take-off device consisting of a condenser and a receiver.

The reactor was charged with 1200 grams of bis-phenol-A diacetate, 319.1 grams of isophthalic acid, 319.1 grams of terephthalic acid and 740 grams of diphenol ether (35 weight percent based on the polymer produced). The reactor system was purged with nitrogen for 20 minutes and then the heater turned on to raise the temperatures of the reactor to about 280° C. (the oil heater was set at about 300° C.). Acetic acid started to distill when the temperature of the mixture reached about 260° C. Acetic acid distillation was followed by measuring its level in the receiver. After about 3.0 hours at 280° C., the power draw on the agitator began to increase which indicated a viscosity increase. The reaction was terminated after 5.5 hours at reflux by discharging the contents of the reactor under nitrogen. The reaction product was allowed to cool to room temperature. The reaction product was ground to particles having an average size below ¼ inch and stored in an oven at 50°–60° C., for about 10–15 hours under a vacuum of 75 mm Hg. The polymer was isolated by feeding the reaction product to a single screw two vent extruder and flashing off the solvent. The barrel temperature of the extruder was 325° C., the first vent was under a vacuum of about 500 mm Hg, and the second vent was under a vacuum of about 15–20 mm Hg. The residence time of the polymer in the extruder was 2–5 minutes. The polymer had a reduced viscosity of 0.82 dl/g as measured in chloroform (0.50 gm/100 ml) at 25° C.

The polymer was then added to a Tinius Olsen thermodyne and tested by the procedure as described in Comparative Example A. The reduced viscosity of the samples obtained after 10 and 30 minutes in the thermodyne were 0.72 and 0.66 dl/g, respectively.

EXAMPLE 5

The procedure as described in Comparative Example C to prepare a polyarylate polymer was exactly repeated except that 30 minutes before the end of the reaction, 1.31 g of p-phenylphenol in 20 ml. of diphenyl ether was added.

The polymer produced had a reduced viscosity of 0.62 dl/g as measured in chloroform (0.50 gm/100 ml) at 25° C.

The polymer was then added to a Tinius Olsen thermodyne and tested by the procedure as described in Comparative Example A. The reduced viscosity of the samples obtained after 10 and 30 minutes in the thermodyne were 0.59 and 0.55 dl/g, respectively.

TABLE

| | Aromatic Phenol | | Reduced Viscosity of[1] polymer as prepared (dl/g) | Reduced Viscosity of Polymer[1] After thermal treatment at 375° C. for | | Percent Reduction of Reduced Viscosity of[1] polymer after thermal treatment at 375° C. for | |
|---|---|---|---|---|---|---|---|
| Example | Type | Amount (moles of phenol/moles starting materials $\times 10^{-4}$) | | 10 minutes (dl/g) | 30 minutes (dl/g) | 10 minutes (dl/g) | 30 minutes (dl/g) |
| Comparative Example A | — | — | 0.52 | 0.42 | 0.37 | 19.2 | 28.8 |
| 1 | p-phenylphenol | 0.5 | 0.57 | 0.58 | 0.52 | 0 | 8.7 |
| 2 | p-phenylphenol | 1 | 0.45 | 0.43 | 0.38 | 4.4 | 15.6 |
| 3 | 4-hydroxybenzophenone | 2 | 0.60 | 0.56 | 0.51 | 6.7 | 15.0 |
| 4 | p-naphthol | 2 | 0.46 | 0.43 | 0.39 | 6.5 | 15.2 |
| Comparative Example B | Irganox 1076 | 2 | 0.63 | 0.53 | 0.41 | 15.9 | 35.9 |
| Comparative Example C | — | — | 0.82 | 0.72 | 0.66 | 12.2 | 23.0 |
| 5 | p-phenylphenol | 2 | 0.62 | 0.59 | 0.55 | 4.8 | 11.3 |

[1] all reduced viscosities measured in chloroform at 25° C. (0.5g/100 ml.).

The data in the Table shows that without adding an aromatic phenol to the polymerization reaction, as in Comparative Examples A and C, there is a significant reduction in the reduced viscosity of the polymer after processing in the thermodyne for 10 and 30 minutes. The viscosity of the polymer prepared in comparative Example A, without aromatic phenol, is reduced 19.9 and 28.8 percent, respectively, after 10 and 30 minutes, while the viscosity of the polymer prepared in Comparative Example C, without aromatic phenol, is reduced 12.2 and 23 percent, respectively, after 10 and 30 minutes.

Further, when a hindered phenol, i.e., octadecyl 3-(3',5'-di-t-butyl 4'-hydroxyphenyl)propionate was used (Comparative Example B), no stabilization occurred.

However, when the aromatic phenol of this invention is added to the polymerization reaction (Examples 1 to 5), the viscosity of the polymer is reduced only by a maximum of 6.7 percent after 10 minutes, and only by a maximum of 15.6 percent after 30 minutes. Therefore, when a polyarylate prepared with the aromatic phenol, according to the present invention, is molded or fabricated at the required molding temperature, it does not undergo the severe degradation as does the material prepared without aromatic phenol. Accordingly, no loss of properties is observed.

What is claimed is:

1. A process for preparing a melt stable polyarylate having a reduced viscosity of from about 0.4 to greater than 1.0 dl/gm, which process comprises reacting:
    (a) at least one diester derivative of a dihydric phenol having the following formula:

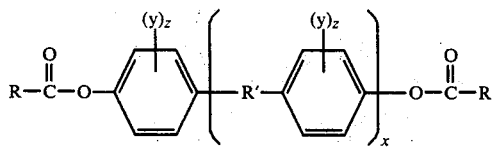

wherein R is independently selected from an alkyl radical having from 1 to about 6 carbon atoms, or cycloalkyl having from 4 to about 7 carbon atoms, y is independently selected from alkyl groups of 1 to 4 carbon atoms, chlorine, or bromine, z independently has a value of from 0 to 4, inclusive, and R' is independently selected from a direct bond, a divalent saturated aliphatic hydrocarbon radical having 1 to 8 carbon atoms, a cycloalkylene or cycloalkylidene radical having up to and including 9 carbon atoms, O, S, SO, SO$_2$, CO, x is 0 or 1; with (b) at least one aromatic dicarboxylic acid, at a temperature of from about 260° to about 350° C.; to form a polyarylate having a reduced viscosity of from about 0.5 to greater than 1.0 dl/g; and (c) adding a stabilizing amount of an aromatic phenol to the polyarylate to form a polyarylate substantially free of anhydride linkages; said aromatic phenol being free of substituents in at least one of the positions ortho to the hydroxy group.

2. A process as defined in claim 1 wherein the diester derivative of a dihydric phenol has the following formula:

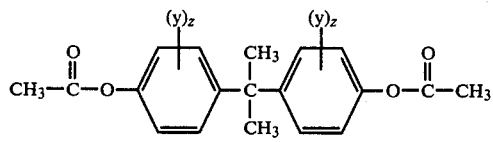

3. A process as defined in claim 2 wherein each z is 0.

4. A process as defined in claim 1 wherein the aromatic dicarboxylic acid is a mixture of isophthalic acid and terephthalic acid.

5. A process as defined in claim 4 wherein the isophthalic acid to terephthalic acid ratio in the mixture is about 20:80 to about 100:0.

6. A process as defined in claim 1, 2, 3, 4 or 5 wherein the aromatic phenol is added in amounts of from 0.01 to about 10 mole percent, based on the amount of the starting materials.

7. A process as defined in claim 6 wherein the aromatic phenol is added in a solvent.

8. A process as defined in claim 6 wherein the aromatic phenol contains at least one and not more than three unhindered hydroxy groups.

9. A process as defined in claim 6 wherein the aromatic phenol is selected from p-phenyl phenol, p-cumylphenol, 4-hydroxybenzophenone, β-naphthol, hydroxy terminated polysulfone or hydroxy terminated polyethersulfone.

10. A process as defined in claim 1, 2, 3, 4 5, 6, 7, 8, or 9 wherein the reaction of the diester derivative of the dihydric phenol and aromatic dicarboxylic acid is carried out in the presence of from about 10 to about 60 weight percent, based on the weight of polyarylate produced, of a solvent.

11. A process as defined in claim 10 wherein the solvent is diphenyl ether.

12. A process as defined in claim 10 wherein the solvent is a cycloaliphatic, substituted aromatic, or heteroaromatic compound which contains at least one benzylic and/or tertiary hydrogen atom.

13. A process as defined in claim 12 wherein the solvent is selected from xylenes, cumene, diethybenzene, disopropyl benzene, tetrahydronaphthalene or decahydronaphthalene.

14. A process as defined in claim 1 wherein the reaction of the diester derivative of the dihydric phenol with the aromatic dicarboxylic acid is performed in the presence of a catalyst.

15. A process as defined in claim 14 wherein the catalyst is selected from magnesium, magnesium oxide and a magnesium or zinc salt of an inorganic acid, or organic acid, or mixtures thereof.

16. A process as defined in claim 15 wherein the catalyst is magnesium acetate.

17. A process as defined in claim 14, 15 or 16 wherein the catalyst is used in amounts of from about 1 to about 1000 parts per million, based on the weight of the polyarylate produced.

18. A process as defined in claim 1 which is carried out at a temperature of from about 275° to about 295° C.

19. A process as defined in claim 1 wherein the polyarylate produced has a reduced viscosity of from about 0.5 to about 0.8.

20. A process for preparing a melt stable polyarylate having a reduced viscosity of from about 0.4 to greater than 1.0 dl/gm which process comprises reacting:

(a) an acid anhydride derived from an acid containing from 2 to 8 carbon atoms;

(b) at least one dihydric phenol having the following formula:

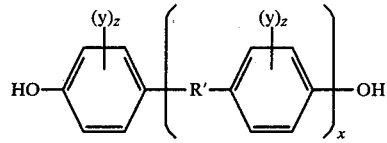

wherein y is independently selected from alkyl groups of 1 to 4 carbon atoms, chlorine or bromine, z independently has a value of from 0 to 4, inclusive and R' is independently selected from a direct bond, a divalent saturated hydrocarbon radical having 1 to 8 carbon atoms, a cycloalkylene or cycloalkylidene radical having up to and including 9 carbon atoms, O, S, SO, SO$_2$, CO, x is 0 or 1; and (c) at least one aromatic dicarboxylic acid, at a temperature of from about 260° to about 350° C., to form a polyarylate having a reduced viscosity of from about 0.5 to greater than 1.0 dl/g; and (d) adding a stabilizing amount of an aromatic phenol to the polyarylate to form a polyarylate substantially free of anhydride linkages; said aromatic phenol being free of substituents in at least one of the positions ortho to the hydroxy group.

21. A process as defined in claim 20 wherein the acid anhydride is acetic anhydride.

22. A process as defined in claim 20 wherein the dihydric phenol has the following formula:

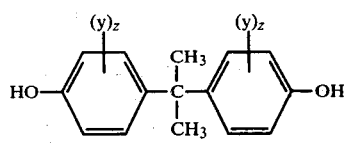

23. A process as defined in claim 22 wherein each z is 0.

24. A process as in claim 20, 21, 22, or 23 wherein the aromatic dicarboxylic acid is a mixture of isophthalic acid and terephthalic acid.

25. A process for preparing a melt stable polyarylate having a reduced viscosity of from about 0.4 to greater than 1.0 dl/gm, which process comprises the following steps:

I. Forming a polyarylate prepolymer having a reduced viscosity of from about 0.1 to about 0.4 dl/gm by reacting:

(a) at least one diester derivative of a dihydric phenol having the following formula:

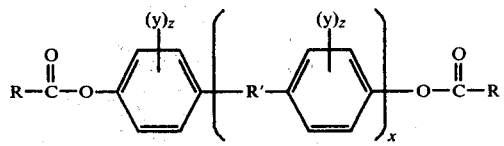

wherein R is independently an alkyl radical having from 1 to about 6 carbon atoms or cycloalkyl having from 4 to about 7 carbon atoms, y is independently selected from alkyl groups of 1 to 4 carbon atoms, chlorine, or bromine, z independently has a value of from 0 to 4, inclusive, and R' is independently selected from a direct bond, a divalent saturated aliphatic hydrocarbon radical having 1 to 8 carbon atoms, a cycloalkylene or cycloalkylidene radical having up to and including 9 carbon atoms, O, S, SO, $SO_2$, CO, x is 0 or 1; with (b) at least one aromatic dicarboxylic acid at a temperature of from about 260° to about 350° C.:

II. heating the prepolymer so formed in a vented extruder under vacuum at a temperature of from about 300° to about 350° C. for a period of time sufficient to form a polyarylate having a reduced viscosity of from about 0.5 to greater than 1.0 dl/g; and III. adding a stabilizing amount of an aromatic phenol to the polyarylate to form a polyarylate substantially free of anhydride linkages; said aromatic phenol being free of substituents in at least one of the positions ortho to the hydroxy group.

26. A polyarylate produced by the process of claim 1, 20 or 25.

* * * * *